United States Patent
Nakagawa et al.

(10) Patent No.: US 8,074,091 B2
(45) Date of Patent: Dec. 6, 2011

(54) STORAGE APPARATUS FOR POWER SAVING AND ACHIEVING LONGEST MEAN TIME BETWEEN FAILURES

(75) Inventors: Hirotaka Nakagawa, Sagamihara (JP); Yuichi Taguchi, Sagamihara (JP); Taro Inoue, Yamato (JP)

(73) Assignee: Hitachi, Ltd., Tokyo (JP)

( * ) Notice: Subject to any disclaimer, the term of this patent is extended or adjusted under 35 U.S.C. 154(b) by 682 days.

(21) Appl. No.: 12/177,387

(22) Filed: Jul. 22, 2008

(65) Prior Publication Data
US 2009/0300387 A1    Dec. 3, 2009

(30) Foreign Application Priority Data
Jun. 3, 2008  (JP) .................................. 2008-146293

(51) Int. Cl.
*G06F 1/32* (2006.01)
(52) U.S. Cl. ........................................ 713/320; 713/324
(58) Field of Classification Search .................. 713/320, 713/324
See application file for complete search history.

(56) References Cited

U.S. PATENT DOCUMENTS

| | | | |
|---|---|---|---|
| 6,986,075 B2* | 1/2006 | Ackaret et al. | 714/4.5 |
| 7,185,118 B2* | 2/2007 | McNeill et al. | 710/6 |
| 7,340,617 B1* | 3/2008 | Wewel et al. | 713/300 |
| 2005/0240792 A1* | 10/2005 | Sicola et al. | 714/1 |
| 2006/0075190 A1* | 4/2006 | Higaki et al. | 711/114 |
| 2007/0061512 A1 | 3/2007 | Taguchi et al. | |
| 2007/0079156 A1* | 4/2007 | Fujimoto | 713/300 |
| 2008/0162960 A1* | 7/2008 | Higaki et al. | 713/310 |

FOREIGN PATENT DOCUMENTS
JP    2007-79754    3/2007
* cited by examiner

*Primary Examiner* — Chun Cao
(74) *Attorney, Agent, or Firm* — Antonelli, Terry, Stout & Kraus, LLP.

(57) ABSTRACT

Proposed is an operation method for seeking a power interruption operation target in which MTBF will become longest. When a target value regarding a power interruption time and a target value regarding a power interruption count per 24 hours is input from an administrator to a management computer, the management computer calculates the MTBF after one year and the annual power consumption for each of the input target values, and, as a power interruption operation target in which the MTBF will become longest in one year, a target value regarding a power interruption time and a target value regarding a power interruption count are respectively selected among multiple target values in which the MTBF will become longest based on each of the calculation results, and displayed on a screen of an output unit.

21 Claims, 17 Drawing Sheets

| STORAGE APPARATUS ID | ArrayGroup ID | ALLOCATED CAPACITY | STORAGE VOLUME | ALLOCATION DESTINATION | CONFIGURATION DISK ID |
|---|---|---|---|---|---|
| ST1 | AG1 | 15GB | VOL001 | HOST1 | DISK001 |
|  |  |  |  |  | DISK002 |
|  |  |  |  |  | DISK003 |
|  |  |  |  |  | DISK004 |
| ⋮ | ⋮ | ⋮ | ⋮ |  | ⋮ |

3641　3642　3643　3644　3645　3646

| Schedule ID | ArrayGroup ID | POWER INTERRUPTION LENGTH x(h) | POWER INTERRUPTION COUNT y | POWER INTERRUPTION TIME |
|---|---|---|---|---|
| CURRENT | AG1 | 10.0 | 4 | 00:00~04:00<br>05:00~07:00<br>08:00~10:00<br>21:00~23:00 |
| Schedule a | AG1 | 14.25 | 8 | 01:30~03:00<br>05:15~10:30<br>12:00~12:45<br>13:30~14:15<br>15:00~17:15<br>18:45~19:30<br>20:15~21:45<br>22:30~24:00 |
| Schedule b | AG1 | 12.0 | 5 | 01:30~03:00<br>05:15~10:30<br>15:00~17:15<br>20:15~21:45<br>22:30~24:00 |
| Schedule c | AG1 | 7.5 | 2 | 05:15~10:30<br>15:00~17:15 |
| Schedule d | AG1 | 5.25 | 1 | 05:15~10:30 |

FIG.13

| DISK | POLICY | $\mu$ |
|---|---|---|
| FC | MTBF ↑ | LARGE |
| SATA | MTBF ↓ | SMALL |

STORAGE APPARATUS FOR POWER SAVING AND ACHIEVING LONGEST MEAN TIME BETWEEN FAILURES

CROSS-REFERENCES

This application relates to and claims priority from Japanese Patent Application No. 2008-146293, filed on Jun. 3, 2008, the entire disclosure of which is incorporated herein by reference.

BACKGROUND

The present invention generally relates to an operation method of a storage apparatus, a storage apparatus and a storage subsystem, and in particular relates to technology for managing power consumption.

In recent years, as a storage apparatus for storing data in corporations and government offices, a so-called disk array device in which a plurality of hard disk devices are managed and operated in RAID (Redundant Array of Inexpensive Disks) format is being widely used.

Since prices of disk array devices have fallen in recent years, a SATA (Serial AT Attachment) disk that is less expensive than an FC (Fibre Channel) disk is being used as the hard disk device.

Meanwhile, in order to reduce the power consumption of magnetic disk devices, a storage apparatus loaded with a MAID (Massive Array of Inactive Disks) function has been proposed. This storage apparatus monitors the access status from a host system and, when access is not made for a given period of time, turns off the power source of the magnetic disk device or sets it to a power-saving mode (refer to Japanese Patent Laid-Open Publication No. 2007-79754; Patent Document 1).

Patent Document 1 discloses power consumption report technology of computing the power consumption for each storage device group based on the operation result of each storage device group, and outputting the power consumption for each storage device group calculated based on the foregoing computation together with the access status of each logical storage area.

According to the conventional technology described above, since power consumption of each logical storage area can be managed in more detail, it is possible to recognize the relationship between the power consumption and the logical storage area and the relationship between the power consumption and the performance result in order to analyze problems and allow the rearrangement of data.

SUMMARY

Since conventional technology does not use MTBF (Mean Time Between Failures) as the index, it is not possible to show the relationship between the reduced power consumption and the MTBF based on the application of the MAID function. Consequently, it is not possible to calculate a power interruption operation target or a power interruption operation schedule that will achieve the longest MTBF and the minimal disk replacement cost.

In other words, if power interruption of turning off the power source of the magnetic disk device is repeated in order to reduce the power consumption, the MTBF of the disk will shorten and, consequently, costs required for replacing the disk will increase in comparison to always keeping on the power source of the magnetic disk device.

Thus, an object of the present invention is to provide an operation method of a storage apparatus, a storage apparatus and a storage subsystem capable of seeking a power interruption operation target in which the MTBF will become longest.

In order to achieve the foregoing object, giving consideration to the fact that the MTBF will get longer if the power interruption time becomes longer and, contrarily, the MTBF will get shorter if the power interruption count increases, the operation method of a storage apparatus according to the present invention respectively sets a plurality of target values regarding a power interruption time and a power interruption count per setting time of the storage apparatus, calculates the mean time between failures of the storage apparatus in an operation period based on the set plurality of target values, and selects a power interruption operation target in which the mean time between failures in the operation period will become longest based on the respective calculation results.

According to the present invention, it is possible to select a power interruption operation target that will achieve the longest MTBF and the minimal disk replacement cost.

DESCRIPTION OF DRAWINGS

FIG. 4 is a configuration diagram of a disk configuration management table;

FIG. 13 is a diagram explaining the relationship between a disk and μ;

DETAILED DESCRIPTION

An embodiment of the present invention is now explained with reference to the attached drawings.

First Embodiment

This embodiment explains a case of inputting a target value regarding a power interruption time and a target value regarding a power interruption count per setting time of a storage apparatus; for instance, per 24 hours, calculating the power consumption and the MTBF of a storage apparatus in an operation period; for instance, in one year based on the plurality of input target values, and selecting a power interruption operation target in which the MTBF will become longest in one year.

Figure 1:
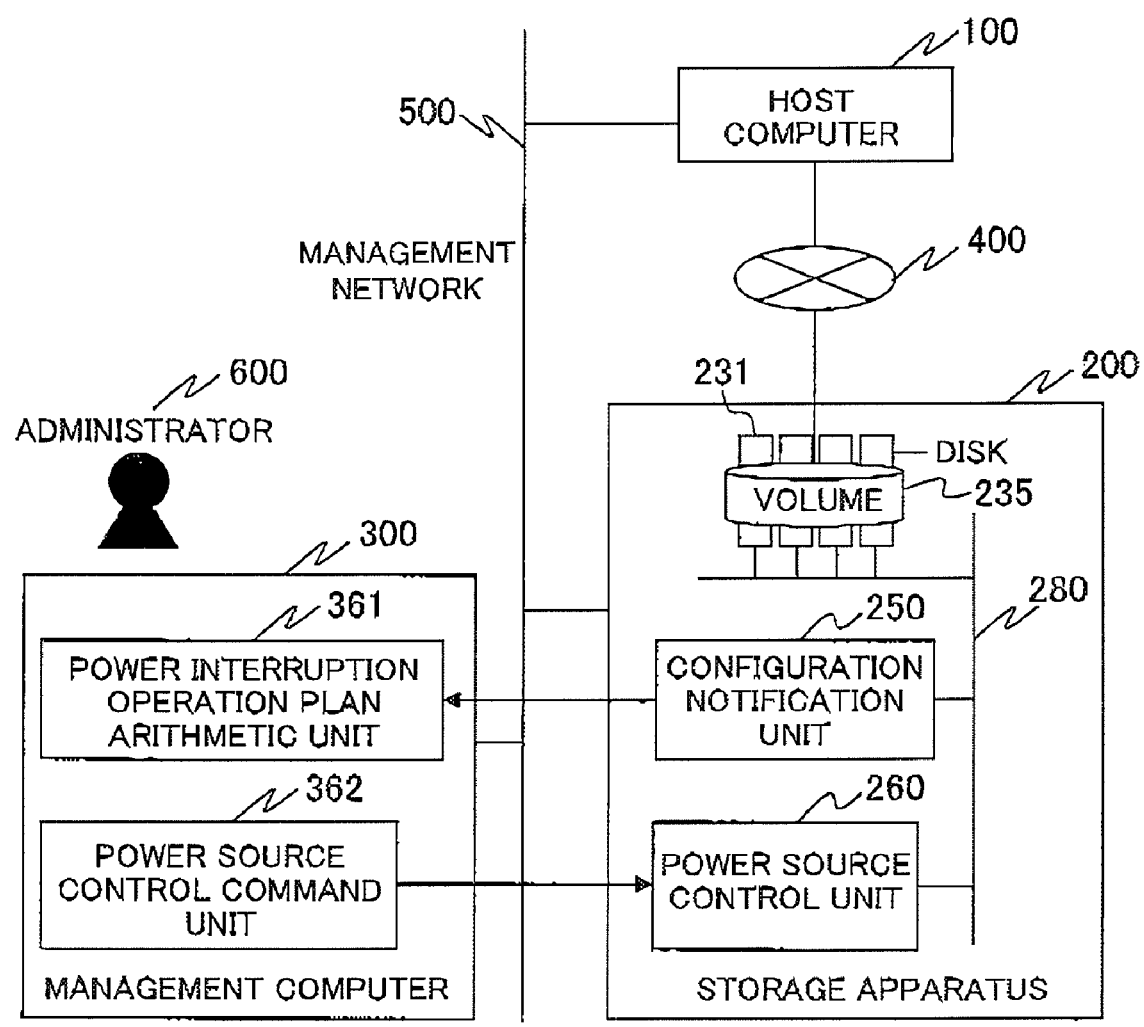
FIG. 1 is a block configuration diagram of a storage subsystem showing the first embodiment of the present invention.

FIG. 1 is a block configuration diagram of a storage subsystem showing the first embodiment of the present invention. In FIG. 1, the storage subsystem comprises a host computer 100 as a host system, a storage apparatus 200, and a management computer 300 as a management terminal. The host computer 100 and the storage apparatus 200 are connected via a communication network 400, and the host computer 100 and the storage apparatus 200 and the management computer 300 are connected via a management network 500. The communication network 400 and the management network 500 are configured from a SAN, a LAN (Local Area Network), Internet, a public line, a dedicated line or the like.

The host computer 100 is a computer device comprising information processing resources such as a CPU (Central Processing Unit) and a memory, and is configured from a personal computer, a workstation, a mainframe or the like. The host computer 100 additionally comprises an information input device (not shown) such as a keyboard, a switch, a pointing device or a microphone, and an information output device (not shown) such as a monitor display or a speaker.

Figure 2:
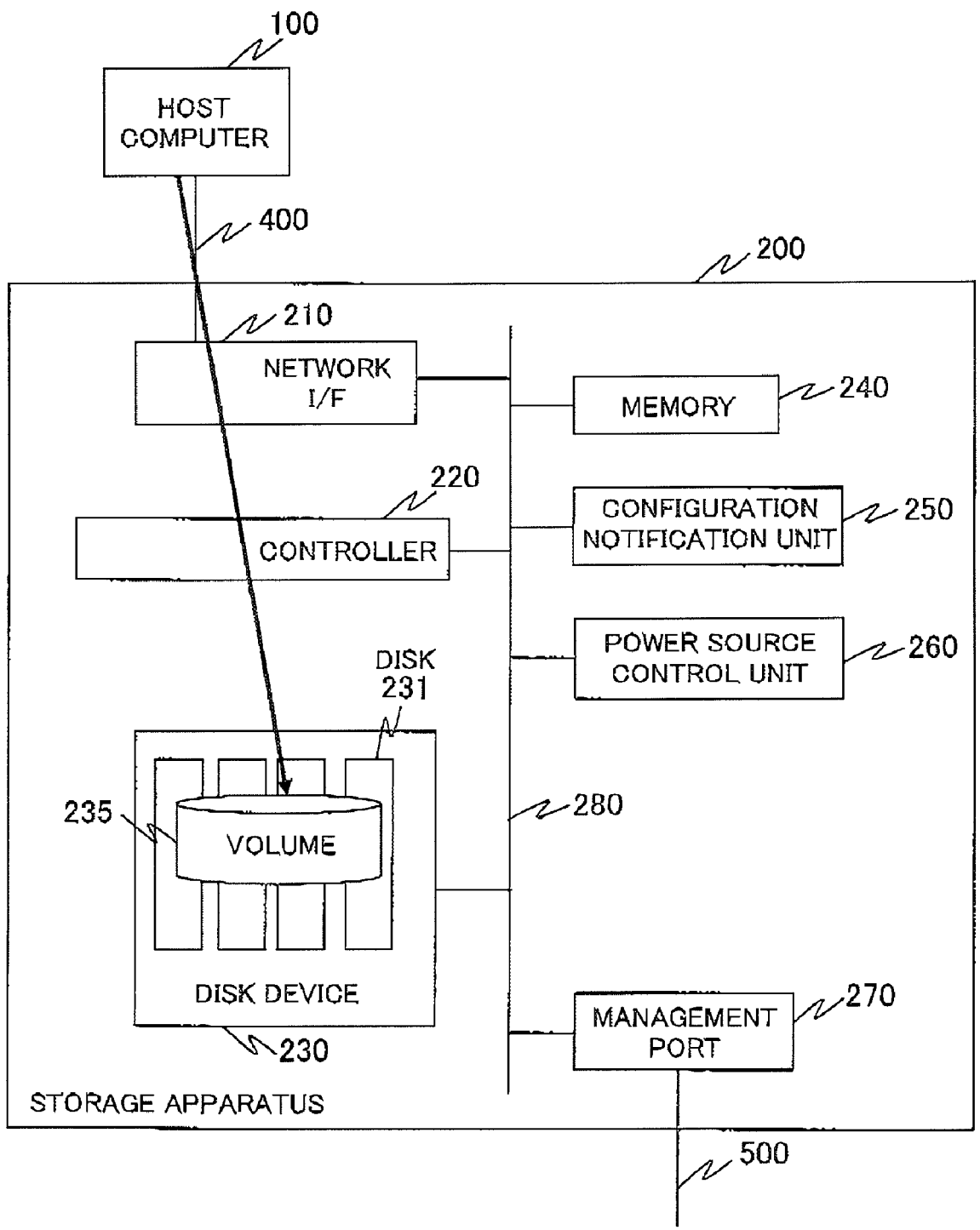
FIG. 2 is a block configuration diagram of a storage apparatus.

The storage apparatus 200 comprises, as shown in FIG. 2, a network interface (I/F) 210, a controller 220, a disk device 230, a memory 240, a configuration notification unit 250, a power control unit 260, and a management port 270, and the respective components are connected via a bus 280.

The network interface 210 is connected to the host computer 100 via the communication network 400, and is configured as an interface for sending and receiving information to and from the host computer 100 via the communication network 400. The controller 220 governs the operational control of the overall storage apparatus 200, and also functions as a disk control unit for write-accessing or read-accessing the disk device 230 based on an access request from the host computer 100.

The disk device 230 is configured as a storage unit for storing data to be accessed by the host computer 100, and comprises a plurality of disks 231 as storage devices. One or more logical storage areas are set in a storage area of a plurality of disks 231. This logical storage area is configured as a logical volume 235 that is accessible from the host computer 100. A logical volume number is allocated to the logical volume 235 for each correspondence relationship of the network interface 210 and the logical storage area.

The memory 240 stores configuration information of the overall apparatus and program memories. The configuration notification unit 250 functions as a measurement unit for respectively measuring the actual power interruption time and power interruption count per setting time of each disk (storage device) 231; for instance, per 24 hours, and notifies the measurement result to the management computer 300 via the management port 270.

The power control unit 260 is loaded with a function for turning ON/OFF the power source of the disk device 230 according to a command received from the management computer 300 for turning ON/OFF the power source of the disk device 230 via the management port 270; that is, it is loaded with a function for controlling the power interruption time of the power source.

The management port 270 is connected to the management computer 300 via the management network 500, and functions as an interface for sending and receiving information to and from the management computer 300.

Figure 3:
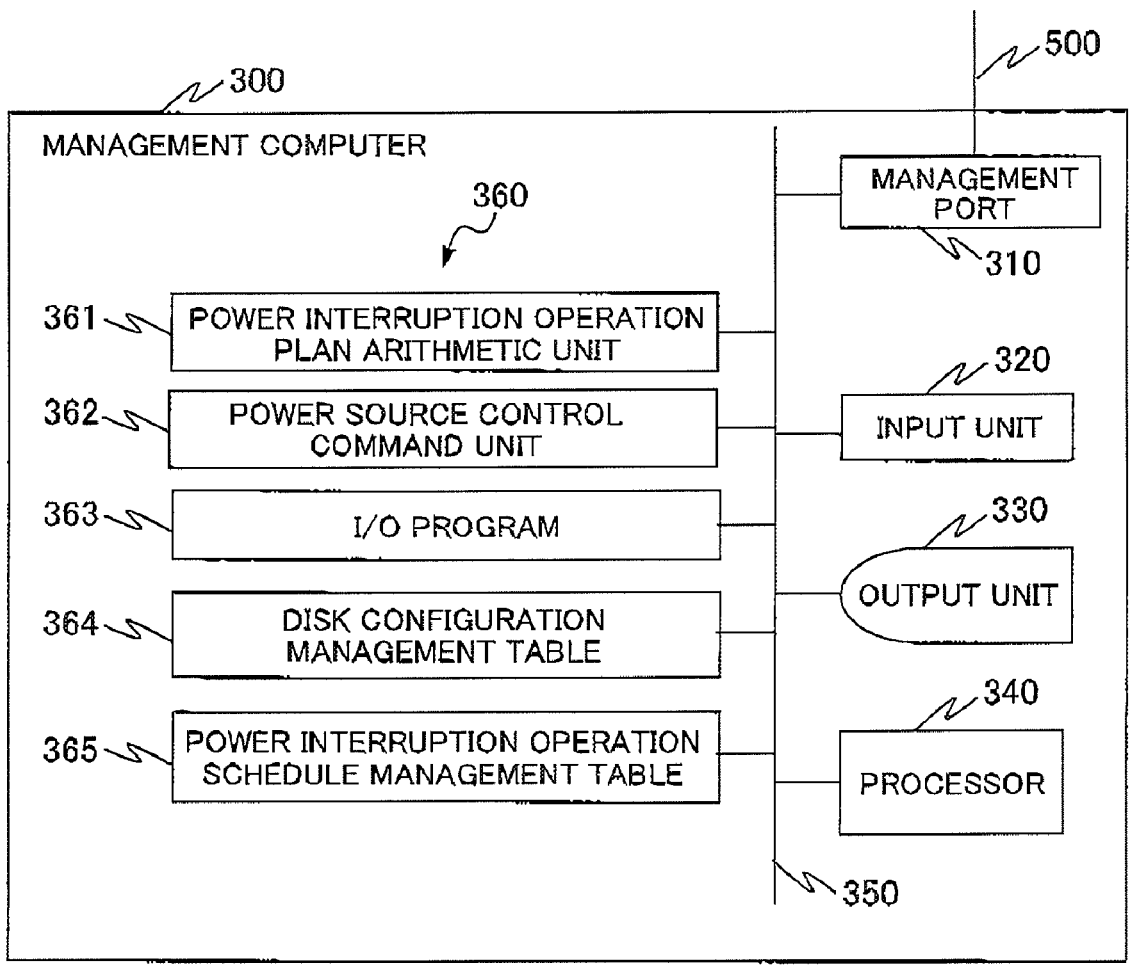
FIG. 3 is a block configuration diagram of a management computer.

The management computer 300 comprises, as shown in FIG. 3, a management port 310, an input unit 320, an output unit 330, a processor 340, a bus 350, and a memory 360.

The management port 310 is connected to the host computer 100 and the storage apparatus 200 via the management network 500, and is configured as an interface for sending and receiving information to and from the host computer 100 and the storage apparatus 200.

The input unit 320 is configured from a keyboard, a mouse or the like, and inputs information associated with the operation of the administrator 600.

The output unit 330 is configured from an LCD device, a CRT, a printer or the like, and displays the arithmetic result on a screen or prints such arithmetic result on paper when the processor 340 outputs information.

The processor 340 governs the operational control of the overall management computer 300, and also functions as an arithmetic unit for performing various arithmetic operations based on the various tables and programs stored in the memory 360.

The memory 360 stores a power interruption operation plan arithmetic unit 361, a power source control command unit 362, an I/O program 363, a disk configuration management table 364, and a power interruption operation schedule management table 365.

The power interruption operation plan arithmetic unit 361 functions as a program that is started up when the processor 340 performs power interruption operation plan arithmetic computation. The power source control command unit 362 functions as a program for issuing commands to control the ON/OFF of the power source of the disk device 230 based on the power interruption operation plan arithmetic computation of the processor 340.

The I/O program 363 is a program that is started up when information is input to the input unit 320 or when information is output from the output unit 330.

The disk configuration management table 364 is a table for managing the storage area of the disk device 230 and, as shown in FIG. 4, is configured from a storage apparatus ID (Identification) field 3641, an array group (Array Group) ID field 3642, an allocated capacity field 3643, a storage volume field 3644, an allocation destination field 3645, and a configuration disk ID field 3646.

The storage apparatus ID field 3641 a unique name such as ST1 for identifying the storage apparatus 200. The array group ID field 3642 stores an identification number such as AG1 that is unique to the array group when the disk 231 is partitioned for each array group. The allocated capacity field 3643 stores, for example, 15 G as the capacity allocated to the array group. The storage volume field 3644 stores a name of the volume such as VOL001 for identifying the storage volume of the array group. The allocation destination field 3645 stores, for example, HOST1 as the allocation destination host computer 100 of the storage apparatus 200. The configuration disk ID field 3646 stores IDs such as DISK001 to DISK004 for identifying the disks 231 configuring the array group.

Figure 5:
FIG. 5 is a configuration diagram of a power interruption operation schedule management table.

The power interruption operation schedule management table 365 is a table for managing the power interruption operation schedule of the storage apparatus 200 and, as shown in FIG. 5, is configured from a schedule ID field 3651, an array group ID field 3652, a power interruption length field 3653, a power interruption count field 3654, and a power interruption time field 3655.

The schedule ID field 3651 stores, for example, "Current" as the schedule ID when the storage apparatus 200 is actually being operated, and stores, for example, Schedule a to d as information to replace the current power interruption operation schedule when another power interruption operation schedule is requested during the operation of the storage apparatus 200.

The array group ID field 3652 stores, for example, "AG1" as a unique number for identifying the array group. The power interruption length field 3653 stores, for example, "10.0" as the total power interruption time in which the power source of the storage apparatus 200 is turned off during 24 hours when the setting time is set to 24 hours as the power interruption time x(h).

The power interruption count field 3654 stores, for example, "4" as the power interruption count y per day (24 hours).

The power interruption time field 3655 stores information concerning the power interruption time per day. For instance, if the power interruption time x(h) is 10.0 and the power interruption count y is 4, 00:00 to 04:00, 05:00 to 07:00, 08:00 to 10:00, and 21:00 to 23:00 are stored as the power interruption time.

The processing to be performed by the management computer 300 for selecting a power interruption operation target in which the MTBF will become longest in the operation of the storage apparatus 200 is now explained. Here, the administrator 600 inputs the following three types of values as the target values of the power interruption time x and the power interruption count y.

$$x=14.0[h], y=54 \text{ [times]} \quad (a)$$

$$x=7.0[h], y=8 \text{ [times]} \quad (b)$$

$$x=2.0[h], y=2 \text{ [times]} \quad (c)$$

When the three types of target values are input, the processor 340 of the management computer 300 starts up the power interruption operation plan arithmetic unit 361, and executes processing for selecting a power interruption operation target in which the MTBF will become longest.

Foremost, the processor 340 calculates the MTBF of one year (after one year) as the operation period according to the following Formula (1).

$$MTBF_{year}=MTBF_{now}+[1/(360\times24)]\times x\times365- MTBF_{on}\times\mu\times y\times365 \quad (1)$$

Here, $MTBF_{now}$ represents the MTBF (year) at the time of execution. $[1/(360\times24)]\times x\times365$ represents the extended number of years of the MTBF based on power interruption. $MTBF_{on}\times\mu\times y\times365$ represents the reduced number of years of the MTBF based on the number of times that the disk was turned ON/OFF. $\mu$ represents the reduction rate (%) of the MTBF in a single power interruption.

Subsequently, the processor 340 calculates the annual power consumption in array group units according to the following Formula (2).

$$Wh_{AG}=D_{num}\times W_{disk}\times(24-x)\times365 \quad (2)$$

Here, $Wh_{AG}$ represents the annual power consumption [Wh] of the array group. $D_{num}$ shows the number of disks [disks] of the array group. $W_{disk}$ represents the power consumption [W/disk] of the disk.

Figure 6:
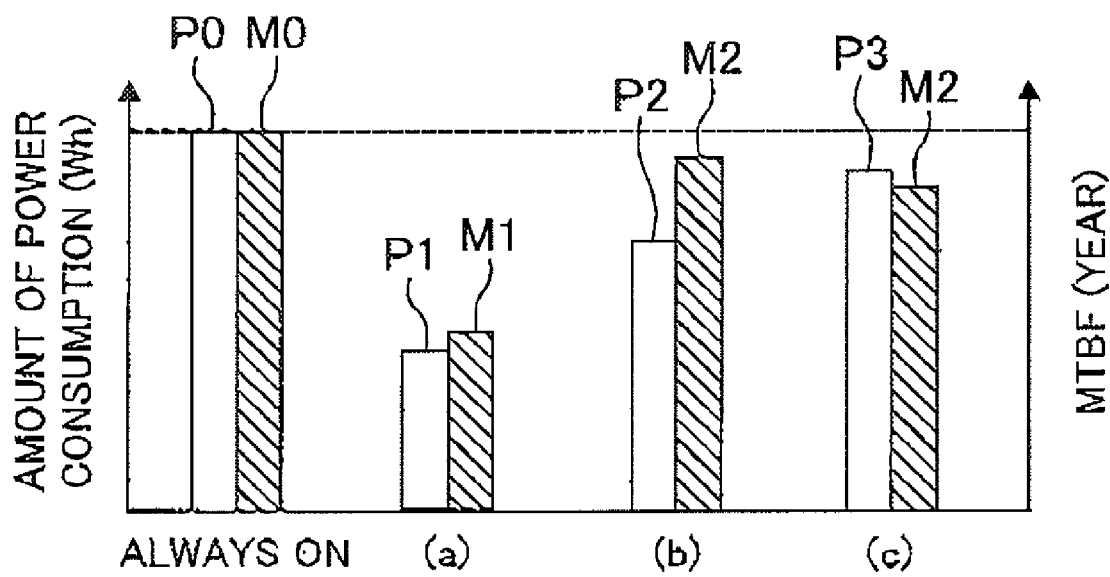
FIG. 6 is a diagram explaining the relationship between the power consumption and MTBF of the power interruption operation schedule.

The arithmetic results according to Formulas (1) and (2) are shown in FIG. 6. In FIG. 6, P0 shows the power consumption during an "Always ON" status, and M0 shows the MTBF during an "Always ON" status. Meanwhile, P1 shows the power consumption and M1 shows the MTBF when using the target value (x=14.0[h], y=54 [times]) of (a). P2 shows the power consumption and M2 shows the MTBF when using the target value (x=7.0[h], y=8 [times]) of (b). Similarly, P3 shows the power consumption and M3 shows the MTBF when using the target value (x=2.0[h], y=2 [times]) of (c).

From FIG. 6, it is possible to select (pick out) the target value of (a); that is, x=14.0[h], y=54 [times] as the power interruption [operation] target in which the MTBF will become longest.

Upon selecting the target value of (a); that is, x=14.0[h], y=54 [times] as the power interruption target in which the MTBF will become longest, it is possible to calculate [an operation schedule] obtained by allocating the power interruption time x along a temporal axis of one year (operation period) based, on the selected target value as the power interruption operation schedule, and operate the storage apparatus 200 according to the calculated power interruption operation schedule.

Meanwhile, while operating the storage [apparatus] 200 according to the power interruption operation schedule, the power interruption operation target during operation can be calculated by the configuration notification unit 250 respectively measuring the actual power interruption time x and power interruption count y per 24 hours of the disk 231, and notifying the respective measurement results as a disk access status (IOPS: Input Output Per Second) to the power interruption operation plan arithmetic unit 361.

For instance, if the following three types of results are obtained as auxiliary target values regarding the power interruption time x and power interruption count y per 24 hours of the disk 231 during operation, the MTBF after one year (one year) and the power consumption are sought according to such three types of auxiliary target values.

$$\text{Power interruption if there is no access for 3 minutes:} \\ x=14.0[h], y=54 \text{ [times]} \quad (a)$$

$$\text{Power interruption if there is no access for 20 minutes: } x=7.0[h], y=8 \text{ [times]} \quad (b)$$

$$\text{Power interruption if there is no access for 40 minutes; } x=2.0[h], y=2 \text{ [times]} \quad (c)$$

The arithmetic computation of Formulas (1) and (2) is performed based on the auxiliary target values of (a) to (c), and the current power interruption operation target and the power interruption operation target obtained during operation are compared. Here, if the value of the MTBF obtained during operation is greater than the value of the current MTBF, an auxiliary target value corresponding to the MTBF with the largest value is selected among the MTBF values obtained during operation. For instance, the auxiliary target value (x=14.0[h], y=54 [times]) of (a) is selected, an [operation schedule] obtained by allocating the power interruption time x along a temporal axis of one year (operation period) based on the selected auxiliary target value is calculated as the auxiliary power interruption operation schedule, and the storage apparatus 200 is operated using the calculated auxiliary power interruption operation schedule. Specifically, the storage apparatus 200 is operated by switching from the current power interruption operation schedule to the auxiliary power interruption operation schedule obtained during operation.

Figure 7:
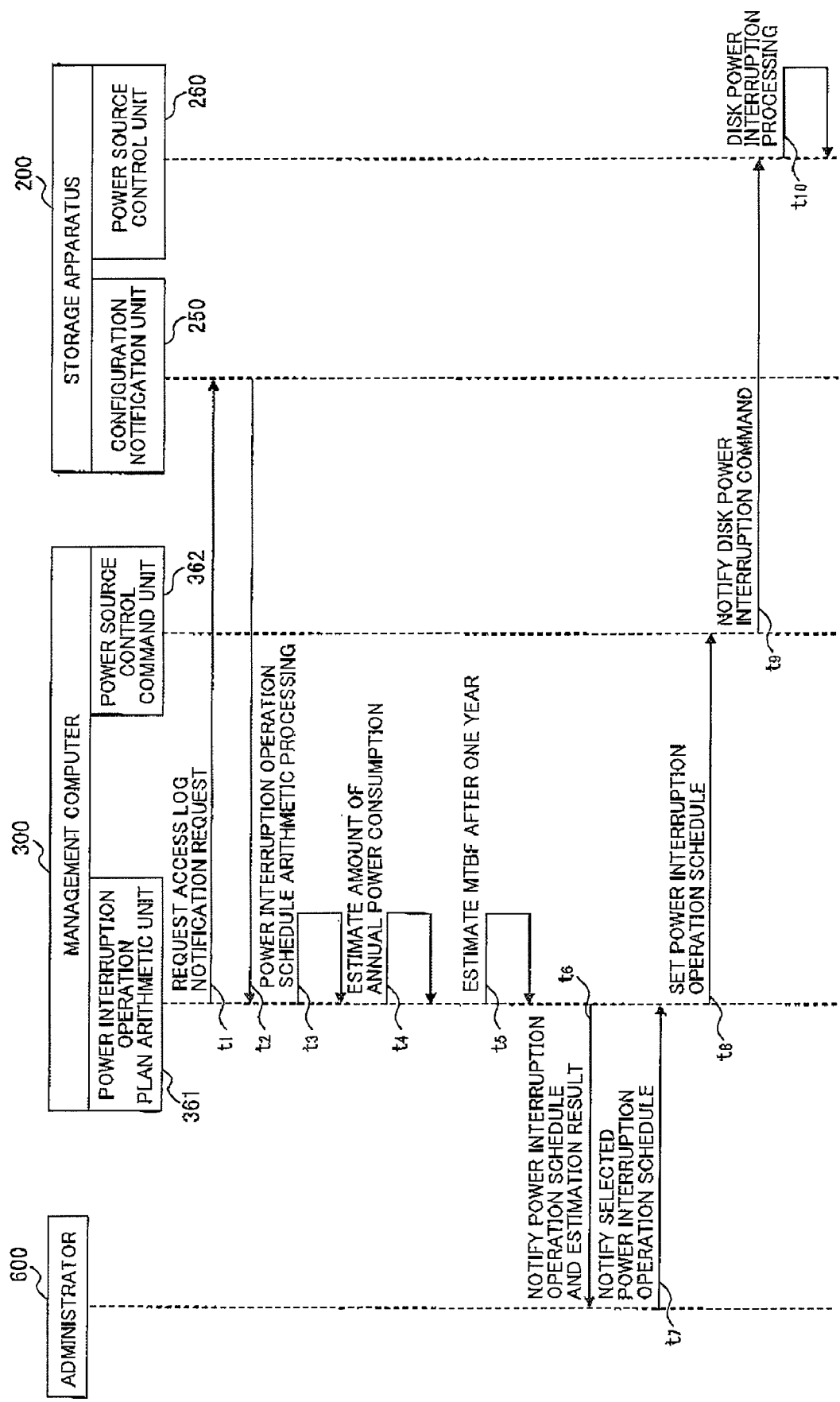
FIG. 7 is a time chart explaining the power interruption operation schedule setting processing to be performed by the management computer.

The method of setting the power interruption operation schedule with the management computer 300 is now explained with reference to the timing chart of FIG. 7. Foremost, when an access log notice request is output at timing t1 from the power interruption operation plan arithmetic unit 361 of the management computer 300 to the configuration notification unit 250 of the storage apparatus 200, the configuration notification unit 250 respectively measures the power interruption time and power interruption count per 24 hours of the disk 231, and outputs the respective measurement results as an access log (IOPS) of each array group to the power interruption operation plan arithmetic unit 361 at timing t2. An example of the access log (IOPS) obtained in this case is shown in FIG. 8.

The power interruption operation plan arithmetic unit 361 thereafter executes the power interruption operation schedule calculation processing at timing t3.

Figure 9:
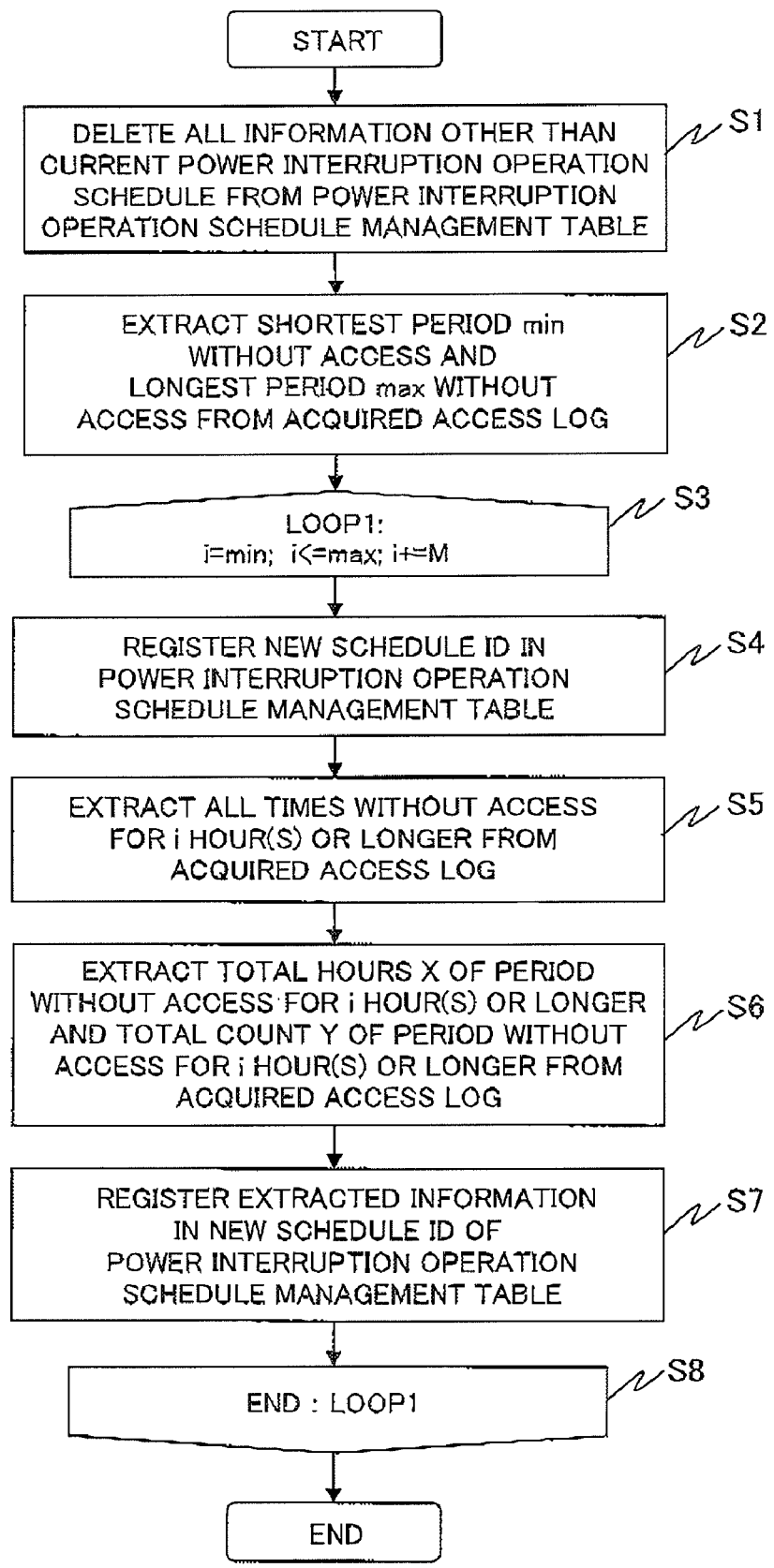
FIG. 9 is a flowchart explaining the power interruption operation schedule arithmetic processing.

The power interruption operation schedule calculation processing is now explained with reference to the flowchart of FIG. 9. Foremost, the processor 340 of the management computer 300 refers to the power interruption operation schedule management table 365, deletes information excluding the current power interruption operation schedule (S1), extracts the shortest period min without access and the longest period max without access from the access log acquired from the configuration notification unit 250 (S2), and executes the processing of i=min, i<=max, i+=M as the processing of loop 1 (S3).

Figure 8:
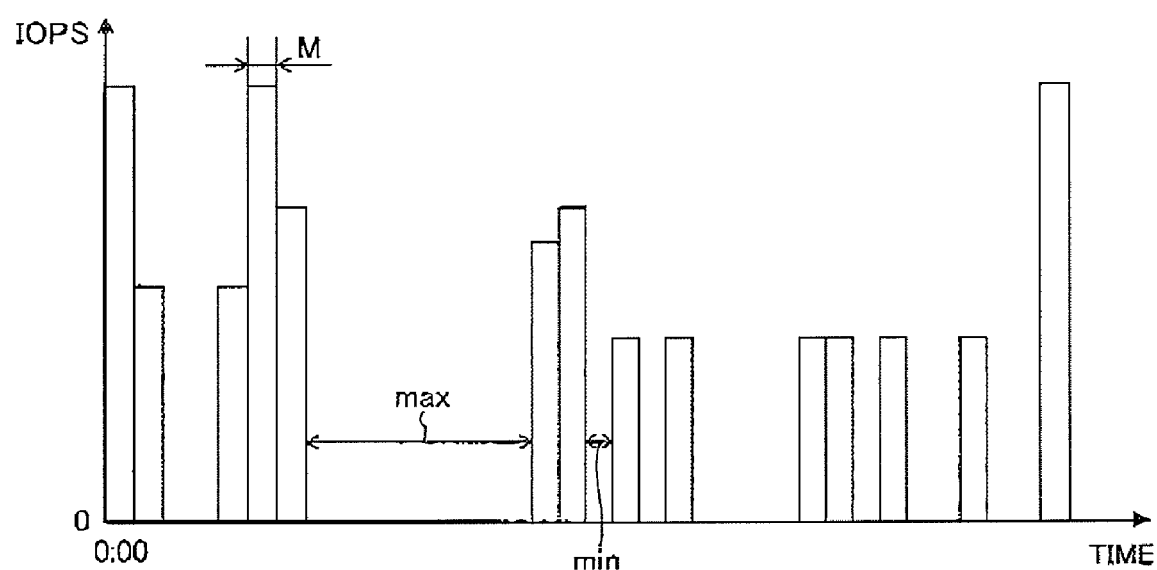
FIG. 8 is a diagram explaining the access log status regarding access to an array group.

Specifically, as shown in FIG. 8, processing is performed for setting the shortest period min without access as i and the longest period without access as max from the access log, and sequentially increasing the access log acquisition interval M set by the administrator 600.

Subsequently, the processor 340 registers a new schedule ID in the schedule ID field 3651 of the power interruption operation schedule management table 365 (S4), extracts all times without access for i hour(s) or longer from the acquired access log (S5), thereafter extracts the total hours X of a period without access for i hour(s) or longer and a total count Y of a period without access for i hour(s) or longer from the acquired access log (S6), registers the extracted information in the new schedule ID of the power interruption operation schedule management table 365 (S7), performs processing for ending the processing of loop 1 (S8), and then ends the processing in this routine.

Subsequently, the processor 340 estimates the annual power consumption according to Formula (2) based on the access log at timing t4 shown in FIG. 7, estimates the MTBF after one year (one year) according to Formula (1) [at timing t5], creates an auxiliary power interruption operation schedule during operation based on the respective estimation results, and notifies the created auxiliary power interruption operation schedule and the estimation results to the administrator 600 at timing t6.

Figure 10:
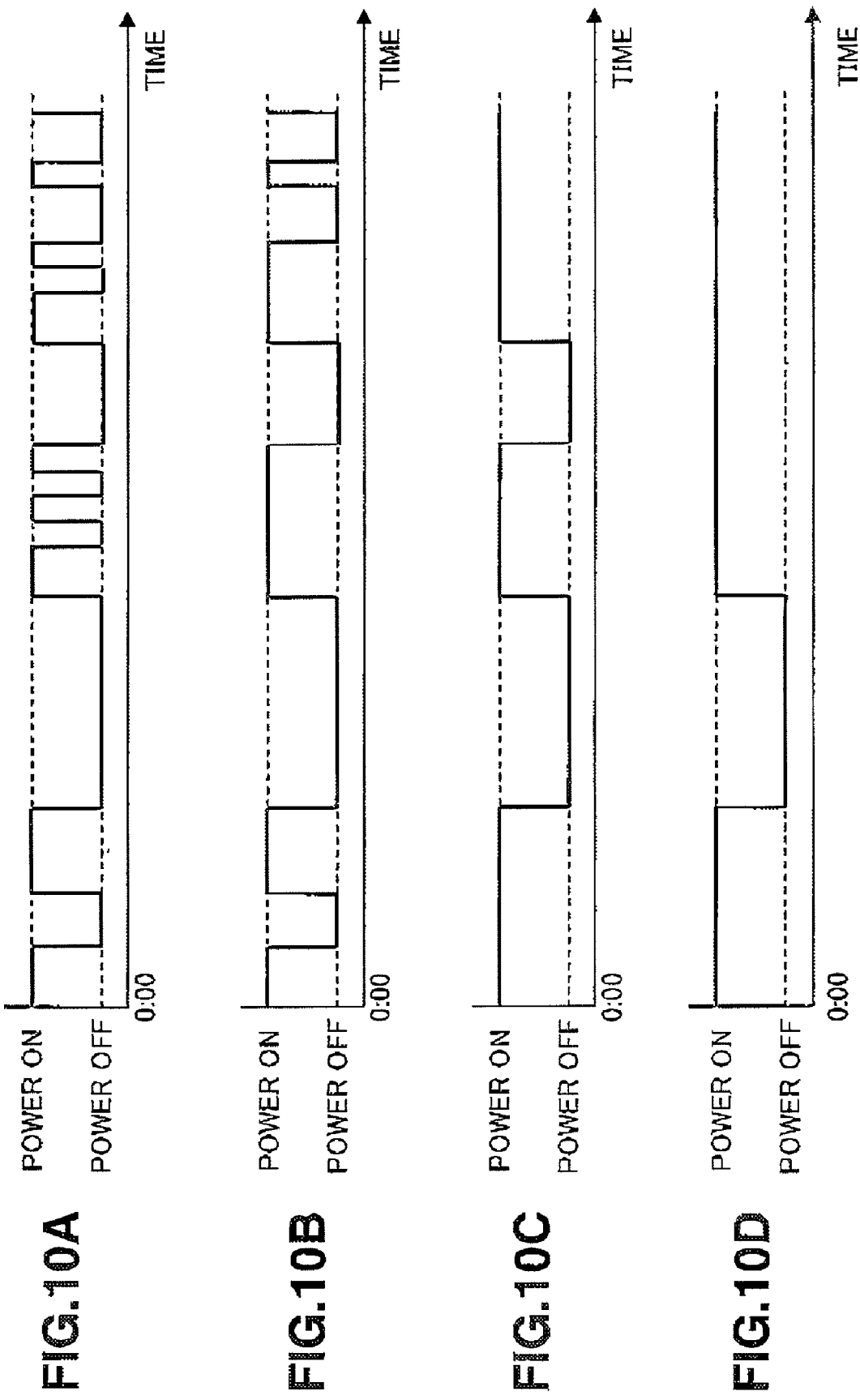
FIG. 10A to FIG. 10D are configuration diagrams of a power interruption operation schedule.

In this case, as shown in FIG. 10, if the time that the disk 231 is not accessed is set as Ta and the power source is to be turned off when Ta≧M, an auxiliary power interruption operation schedule as shown in FIG. 10A is created. Moreover, if the power source is to be turned off when Ta≧2M, an auxiliary power interruption operation schedule as shown in FIG. 10B is created. If the power source is to be turned off when Ta≧3M, an auxiliary power interruption operation schedule as shown in FIG. 10C is created. If the power source is to be turned off when Ta≧4M, an auxiliary power interruption operation schedule as shown in FIG. 10D is created.

Figure 11:
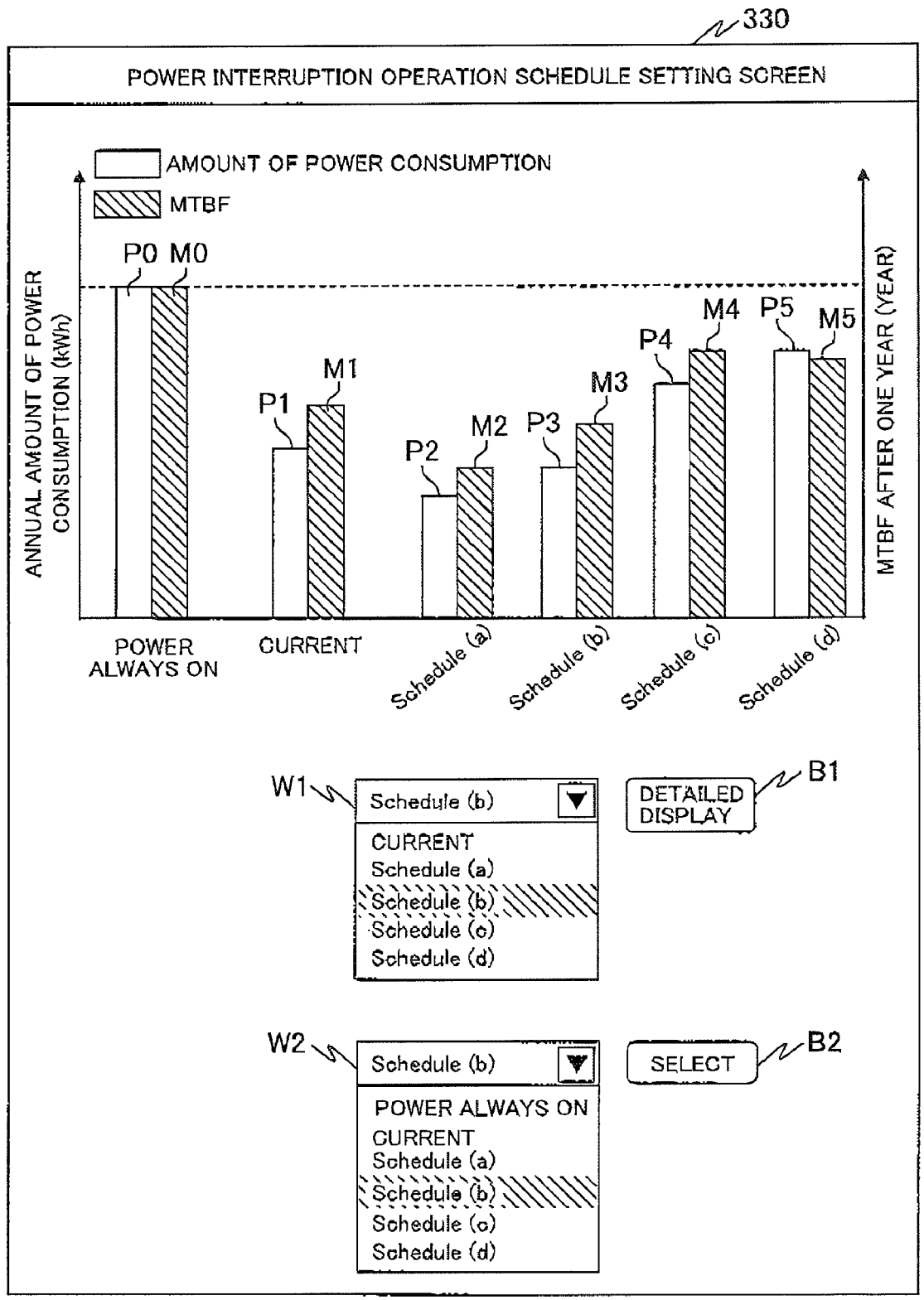
FIG. 11 is a diagram showing a display example of a power interruption operation schedule setting screen.

Here, the processor 340, as shown in FIG. 11, displays the power consumption P2 to P5 and the MTBF M2 to M5 corresponding to the respective auxiliary power interruption operation schedules on the screen of the output unit 330. Incidentally, P0 shows the power consumption when the power source is "Always ON," M0 shows the MTBF when the power source is "Always ON," P1 shows the power consumption according to the current power interruption operation schedule, and M1 shows the MTBF according to the current power interruption operation schedule.

In addition, a detailed screen of the power interruption operation schedule is displayed as a window W1 on the screen of the output unit 330, and, when the administrator 600 clicks the detailed display button B1, the detailed contents of the auxiliary power interruption operation schedules a to d are displayed on the screen. Moreover, the power interruption operation schedule selection screen is displayed on a window W2 and, when the administrator 600 operates the selection button B2 and selects the schedule b for example, the auxiliary power interruption operation schedule according to the schedule b is notified to the power interruption operation plan arithmetic unit 361 at timing t7.

Subsequently, the processor 340 executes processing to the power source control command unit 362 for setting the notified schedule b as the auxiliary power interruption operation schedule at timing t8.

Subsequently, the power source control command unit 362 started up by the processor 340 sends, at timing t9, a disk power interruption command notice for controlling the power interruption of the disk according to the set auxiliary power interruption operation schedule to the power control unit 260.

The power control unit 260, thereafter executes the disk power interruption processing (processing of turning off the power source of the disk 231) at timing t10 according to the processing of the controller 220.

Figure 12:
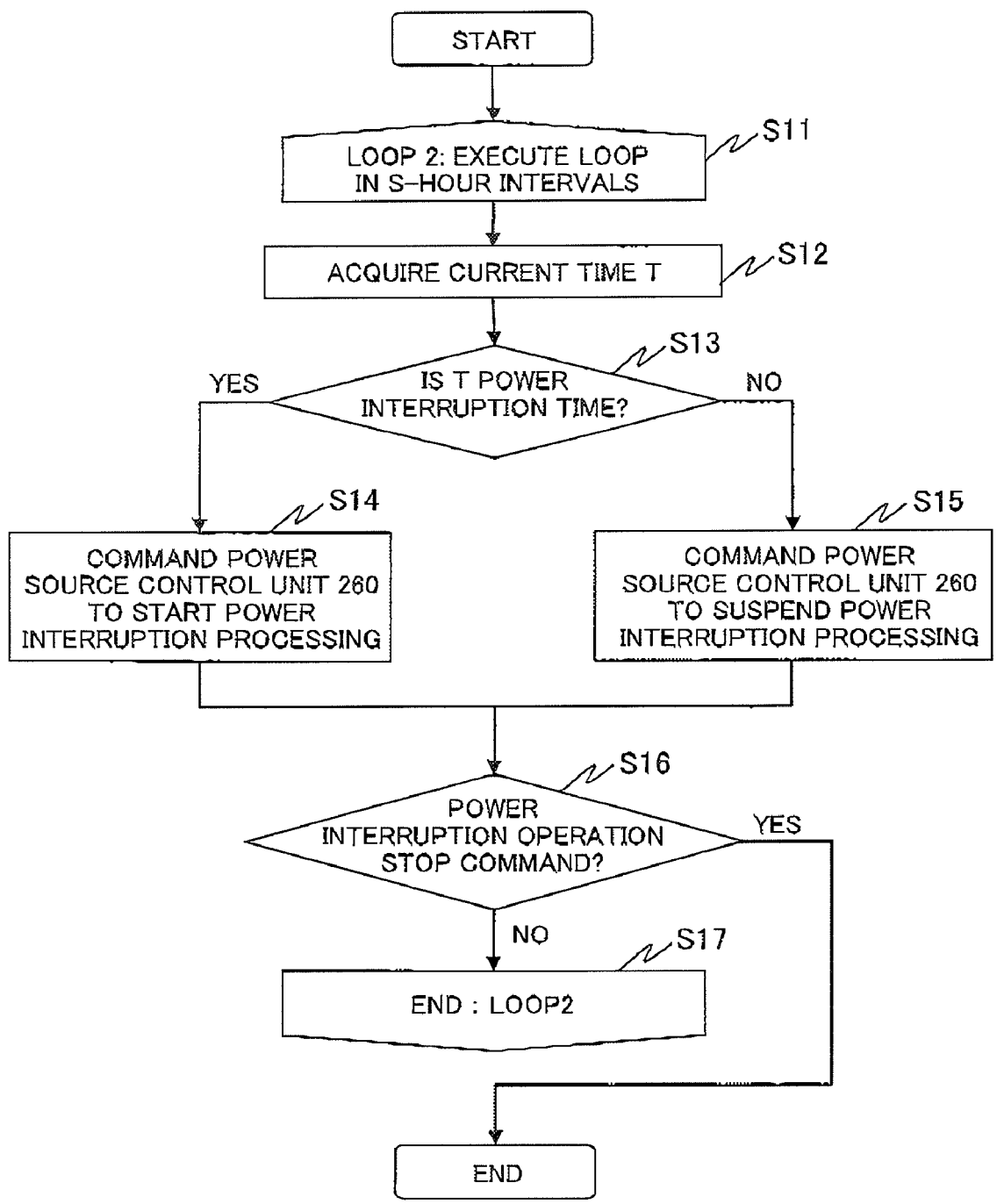
FIG. 12 is a flowchart explaining the power interruption operation command processing.
Figure 14:
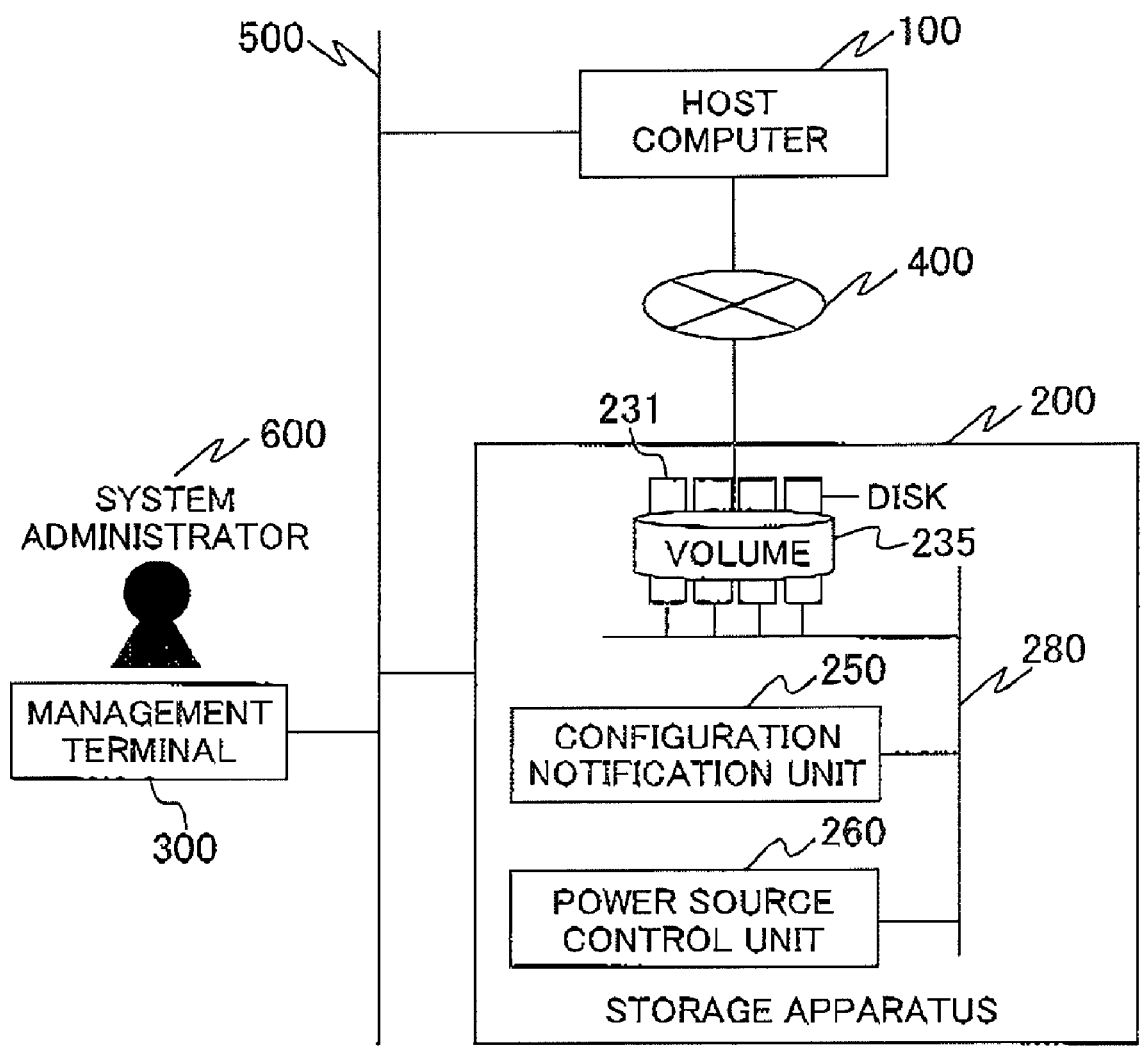
FIG. 14 is a block configuration diagram of a storage subsystem showing the second embodiment of the present invention.

The power interruption operation command processing is now explained with reference to the flowchart of FIG. 12. Foremost, the power source control command unit 362 of the management computer 300 executes loop 2 at S time intervals as the access log acquisition interval set by the administrator 600 (S11), acquires the current time T according to the auxiliary power interruption operation schedule (S12), determines whether the current time T is a power interruption time (S13), and, if the current time T is a power interruption time, commands the power control unit 260 of the storage apparatus 200 to start the power interruption processing (S14), and, if the current time T is not a power interruption time, commands the power control unit 260 of the storage apparatus 200 to suspend the power interruption processing (S15).

Subsequently, the power source control command unit 362 determines whether there is a power interruption operation stop command based on the auxiliary power interruption operation schedule (S16), executes the processing of loop 2 if there is no such command (S17), and ends the processing in this routine if there is a power interruption operation stop command.

According to this embodiment, by inputting the respective target values of (a) (x=14.0[h], y=54 [times]), (b) (x=7.0[h], y=8 [times]), and (c) (x=2.0[h], y=2 [times]) regarding the power interruption time x and power interruption count y per 24 hours into the management computer 300, the management computer 300 is able to calculate the power consumption and the MTBF of the storage apparatus 200 in one year based on the input plurality of target values (a) to (c), and select a power interruption operation target in which the MTBF will become longest in one year based among the plurality of target values (a) to (c) based on the respective calculation results.

Moreover, according to the present embodiment, if the value of the MTBF of the auxiliary power interruption operation schedule obtained from the disk access status (IOPS) is greater than the value of the MTBF of the current power interruption operation schedule during the operation of the storage apparatus 200, the storage apparatus 200 can be operated by switching from the current power interruption operation schedule to the auxiliary power interruption operation schedule obtained during operation.

Furthermore, according to the present embodiment, power interruption operation can be constantly performed so that the MTBF becomes longest upon operating the MAID function.

In addition, p can be set in consideration of the type of disk 231 upon calculating the MTBF according to Formula (1). For instance, as shown in FIG. 13, when using an FC disk or a SATA disk, by setting p to be a large value when using an FC disk and setting μ to be a small value when using a SATA disk, the value of the MTBF when using the FC disk can be made greater than the value of the MTBF when using the SATA [disk].

Second Embodiment

This embodiment explains a case where the storage apparatus 200 is provided with a function as an arithmetic unit for computing the power interruption operation schedule and the like in substitute for using the management computer 300 as the arithmetic unit, and the arithmetic result of the arithmetic unit is transferred to the management computer 300. The remaining configuration is the same as the first embodiment.

The storage subsystem in the second embodiment comprises a host computer 100, a storage apparatus 2007 and a management computer 300 as a management terminal, and the host computer 100 is connected to the storage apparatus 200 via a communication network 400, and the management terminal 300 is connected to the host computer 100 and the storage apparatus 200 via a management network 500.

Figure 15:
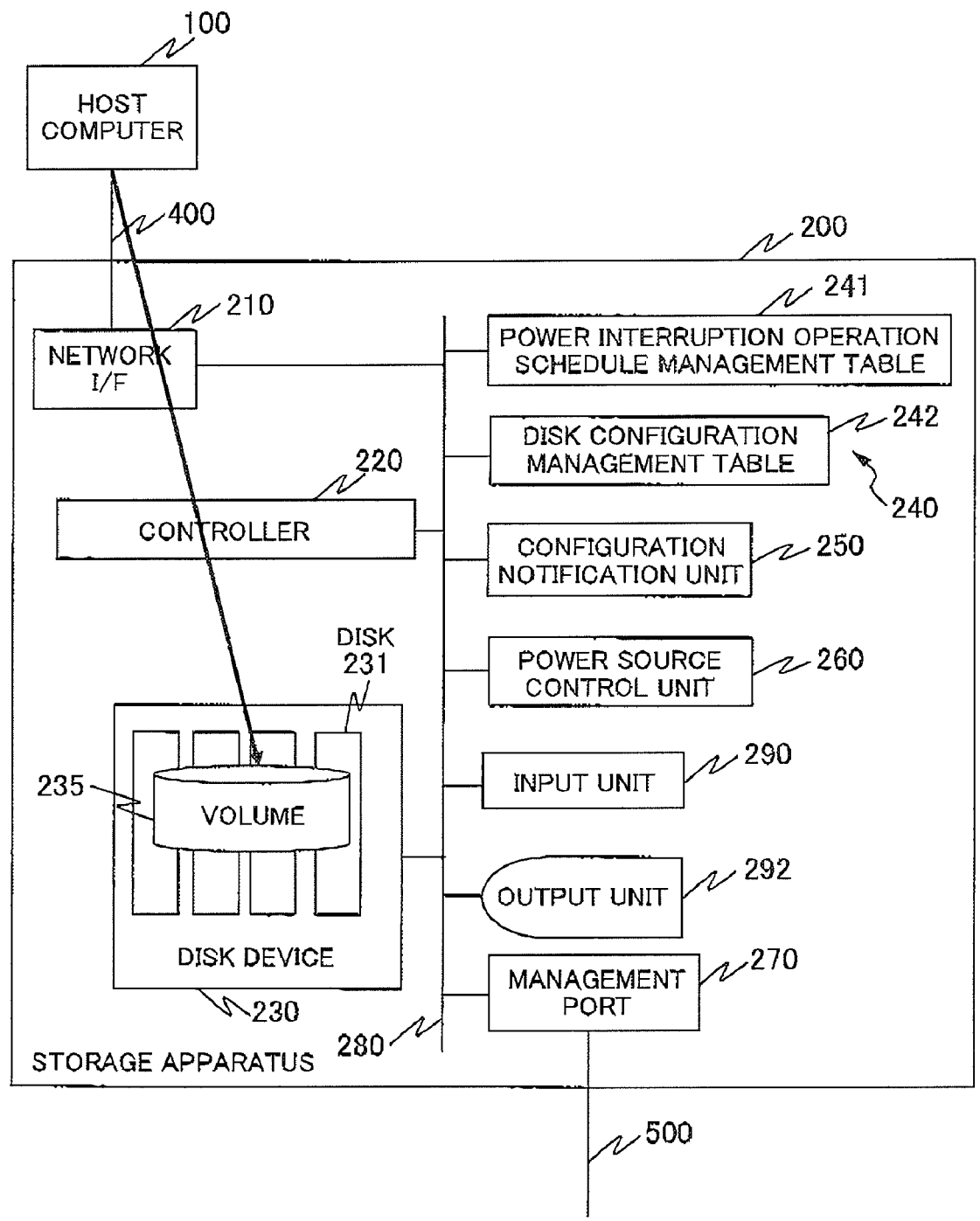
FIG. 15 is a block configuration diagram of a storage apparatus according to the second embodiment.

The storage apparatus 200 comprises, as shown in FIG. 15, a network interface 210, a controller 220, a disk device 230, a memory 240, a configuration notification unit 250, a power control unit 260, and a management port 270.

The memory 240 stores a power interruption operation schedule management table 241 configured the same as the power interruption operation schedule management table 365, and a disk configuration management table 242 configured the same as the disk configuration management table 364. Further, the storage apparatus 200 comprises an input unit 290 configured the same as the input unit 320 and an output unit 292 configured the same as the output unit 330.

Figure 16:
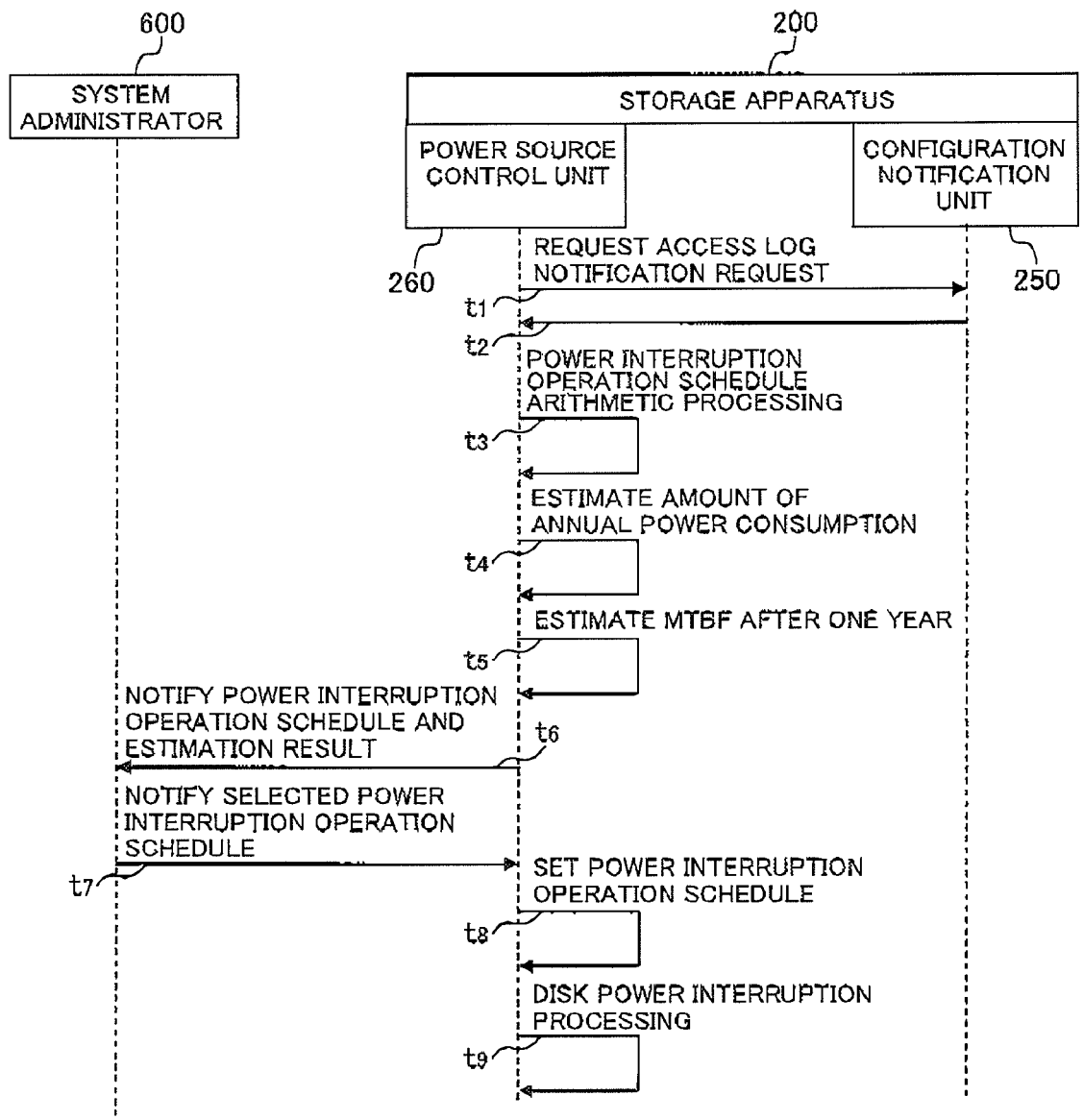
FIG. 16 is a time chart explaining the power interruption operation schedule setting processing according to the second embodiment.

The power interruption operation schedule setting processing to be performed by the storage apparatus 200 is now explained with reference to the timing chart of FIG. 16. Foremost, when an access log notice request is output at timing t1 from the power control unit 260 of the storage apparatus 200 to the configuration notification unit 250, the configuration notification unit 250 respectively measures the power interruption time and power interruption count per 24 hours of the disk 231, and outputs the respective measurement results as an access log (IOPS) of the respective array groups to the power control unit 260 at timing t2.

Figure 17:
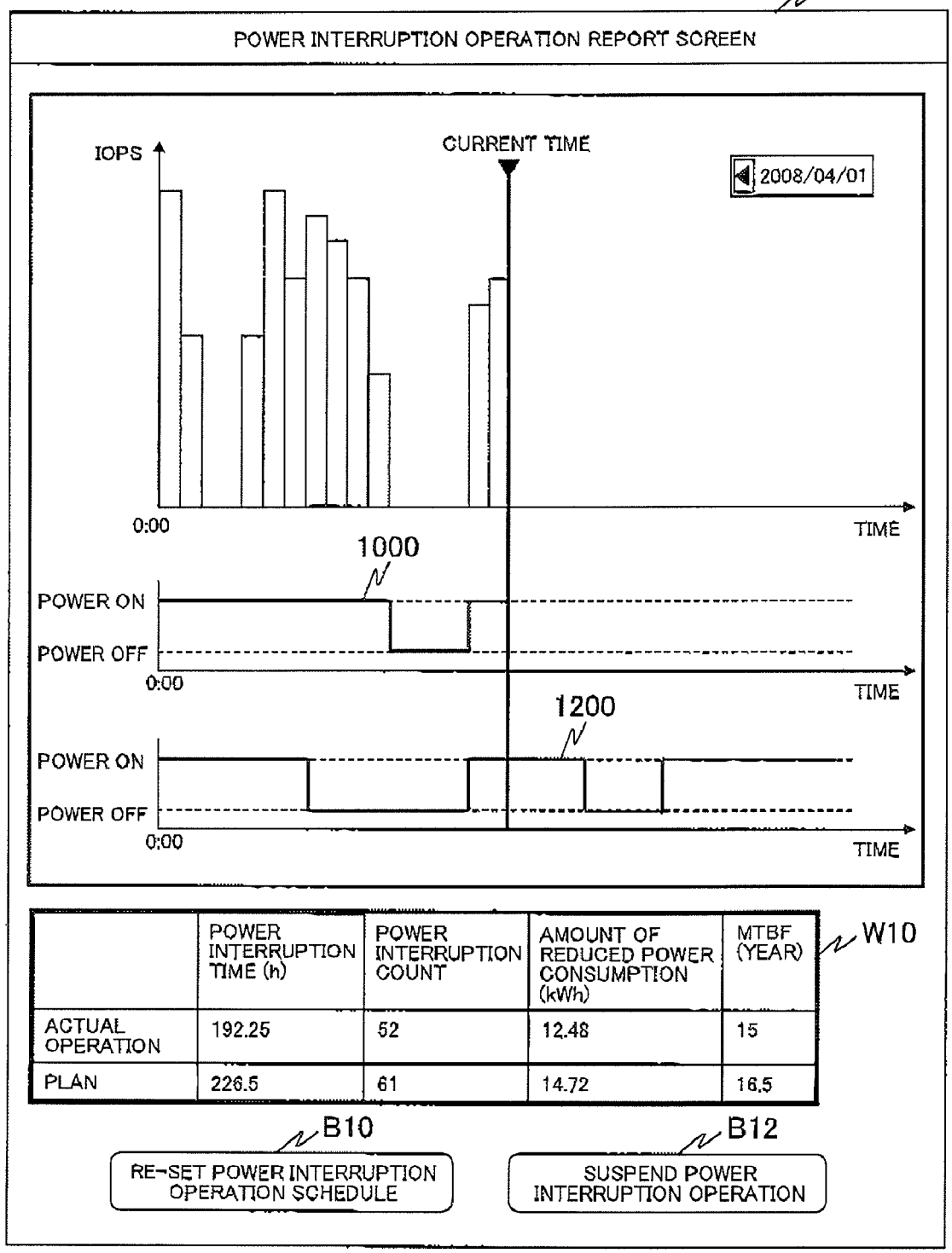
FIG. 17 is a diagram showing a display example of a power interruption operation report screen.

Here, when the configuration notification unit 250 acquires the access status concerning the array group 1, as shown in FIG. 17, the access status (IOPS) acquired up to the current time is sequentially displayed along a temporal axis on the screen of the output unit 292, the power interruption status of the array group 1 is displayed as a waveform 1000 related to the ON/OFF of the power source, and the power interruption operation schedule 1200 of the array group 1 is displayed along a temporal axis.

The power control unit 260 thereafter, as the arithmetic unit, executes the power interruption operation schedule arithmetic processing at timing t3. As the arithmetic processing, for instance, the same processing as the flowchart shown in FIG. 9 is executed.

Subsequently, the power control unit 260 estimates the annual power consumption according to Formula (2) based on the access log at timing t4, estimates the MTBF after one year (one year) according to Formula (1) at timing 5, creates an annual power consumption during operation based on the respective estimation results, and notifies the created auxiliary power interruption operation schedule and the estimation results to the administrator 600 at timing t6.

Here, as the display screen of the power interruption operation report, a display as shown in FIG. 17 is displayed on the screen of the output unit 292 and on the screen of the management computer 300. For example, the window W10 displays the numerical figures concerning the power interruption time (h), power interruption count, reduced power consumption (kWh), and MTBF (year) of the actual operation, as well as numerical figures concerning the power interruption time (h), power interruption count, reduced power consumption (kWh), and MTBF (year) of the auxiliary power interruption operation schedule (plan).

Here, if the administrator 600 compares the numerical figures and determines that it is necessary to re-set the power interruption operation schedule, the administrator 600 is able to set the auxiliary power interruption operation schedule in substitute for the currently operated power interruption operation schedule by operating the button B10. Here, by operating the button B12, the administrator 600 is able to suspend the currently operated power interruption operation schedule.

When the administrator 600 thereafter selects the auxiliary power interruption operation schedule, the selected auxiliary power interruption operation schedule is notified to the power control unit 260 at timing t7.

Subsequently, the power control unit 260 executes processing for setting the notified auxiliary power interruption operation schedule at timing t8, and thereafter executes the disk power interruption processing for controlling the power interruption of the disk 231 according to the set auxiliary power interruption operation schedule at timing t9.

According to the present embodiment, by inputting the respective target values of the power interruption time x and power interruption count y per 24 hours, the storage apparatus 200 is able to calculate the power consumption and the MTBF of the storage apparatus 200 in one year based on the input plurality of target values, and selects a power interruption operation target in which the MTBF will become longest in one year among the plurality of target values based on the respective calculation results.

Furthermore, according to the present embodiment, if the value of the MTBF of the auxiliary power interruption operation schedule obtained from the disk access status is greater than the value of the MTBF of the current power interruption operation schedule during the operation of the storage apparatus 200, the storage apparatus 200 can be operated by switching from the current power interruption operation schedule to the auxiliary power interruption operation schedule obtained during operation.

What is claimed is:

1. An operation method of a storage apparatus, comprising:
a first step of setting a plurality of target values respectively to a power interruption time and a power interruption count per setting time of the storage apparatus;

a second step of calculating a mean time between failures of the storage apparatus in an operation period that is longer than a setting time based on the set plurality of target values; and a third step of providing a power interruption operation target value in which the mean time between failures in the operation period will become longest based on each of the calculation results.

2. The operation method of a storage apparatus according to claim 1, wherein, at the third step, a target value regarding the power interruption time and a target value regarding the power interruption count are respectively selected among the plurality of target values in which the mean time between failures will become longest as the power interruption operation target.

3. The operation method of a storage apparatus according to claim 1, wherein, a target value regarding the power interruption time and a target value regarding the power interruption count are respectively selected among the plurality of target values in which the mean time between failures will become longest based on the calculation result, and [an operation schedule] obtained by allocating the power interruption time along a temporal axis of the operation period based on a target value regarding the selected power interruption time and a target value regarding the power interruption count is provided as a power interruption operation schedule.

4. The operation method of a storage apparatus according to claim 1, wherein, a target value regarding the power interruption time and a target value regarding the power interruption count are respectively selected among the plurality of target values in which the mean time between failures will become longest based on the calculation result, [an operation schedule] obtained by allocating the power interruption time along a temporal axis of the operation period based on a target value regarding the selected power interruption time and a target value regarding the power interruption count is calculated as a power interruption operation schedule, and the power interruption time of the storage apparatus is controlled according to the calculated power interruption operation schedule.

5. The operation method of a storage apparatus according to claim 1, wherein, actual power interruption time and power interruption count per setting time of the storage apparatus are respectively measured, each of the measurements is analyzed according to an access status to the storage apparatus, a plurality of auxiliary target values are respectively set regarding a power interruption time and a power interruption count per setting time of the storage apparatus based on the analysis, power consumption and mean time between failures of the storage apparatus in the operation period are calculated based on the set plurality of auxiliary target values, and an auxiliary power interruption operation target in which the mean time between failures in the operation period will become longest is provided based on each of the calculation results.

6. The operation method of a storage apparatus according to claim 1, wherein, actual power interruption time and power interruption count per setting time of the storage apparatus are respectively measured, each of the measurements is analyzed according to an access status to the storage apparatus, a plurality of auxiliary target values are respectively set regarding a power interruption time and a power interruption count per setting time of the storage apparatus based on the analysis, power consumption and mean time between failures of the storage apparatus in the operation period are calculated based on the set plurality of auxiliary target values, an auxiliary target value regarding the power interruption time and an auxiliary target value regarding the power interruption count are respectively selected among the plurality of auxiliary target values in which the mean time between failures will become longest based on each of the calculation results, and [an operation schedule] obtained by allocating the power interruption time along a temporal axis of the operation period based on an auxiliary target value regarding the selected power interruption time and an auxiliary target value regarding the power interruption count is provided as an auxiliary power interruption operation schedule.

7. The operation method of a storage apparatus according to claim 1, wherein, a target value regarding the power interruption time and a target value regarding the power interruption count are respectively selected among the plurality of target values in which the mean time between failures will become longest based on the calculation result, [an operation schedule] obtained by allocating the power interruption time along a temporal axis of the operation period based on a target value regarding the selected power interruption time and a target value regarding the power interruption count is calculated as a power interruption operation schedule, and wherein, actual power interruption time and power interruption count per setting time of the storage apparatus operated according to the power interruption operation schedule are respectively measured, each of the measurements is analyzed according to an access status to the storage apparatus, a plurality of auxiliary target values are respectively set regarding a power interruption time and a power interruption count per setting time of the storage apparatus based on the analysis, power consumption and mean time between failures of the storage apparatus in the operation period are calculated based on the set plurality of auxiliary target values, an auxiliary target value regarding the power interruption time and an auxiliary target value regarding the power interruption count are respectively selected among the plurality of auxiliary target values in which the mean time between failures will become longest based on each of the calculation results, [an operation schedule] obtained by allocating the power interruption time along a temporal axis of the operation period based on an auxiliary target value regarding the selected power interruption time and an auxiliary target value regarding the power interruption count is calculated as an auxiliary power interruption operation schedule, the mean time between failures in the calculated power interruption operation schedule and the mean time between failures in the calculated auxiliary power interruption operation schedule are compared, and, if the value of the mean time between failures in the auxiliary power interruption operation schedule is greater, operation is changed to the operation based on the auxiliary power interruption operation schedule.

8. A storage apparatus, comprising:
a storage unit for storing data to be accessed by a host system;
a disk control unit for write-accessing or read-accessing the storage unit based on an access request from the host system; and
an arithmetic unit for sending and receiving information to and from a management terminal and performing arithmetic operation for controlling a power source of the storage unit;
wherein the arithmetic unit inputs from the management terminal a plurality of target values respectively set regarding a power interruption time and a power interruption count per setting time of the storage unit, calculates mean time between failures of the storage unit in an operation period that is longer than a setting time based on the input plurality of target values, and selects a power interruption operation target value in which the mean time between failures in the operation period will become longest based on each of the calculation results.

9. The storage apparatus according to claim 8,
wherein the arithmetic unit respectively selects a target value regarding the power interruption time and a target value regarding the power interruption count among the plurality of target values in which the mean time between failures will become longest as the power interruption operation target, and respectively outputs a target value regarding the selected power interruption time and a target value regarding the power interruption count.

10. The storage apparatus according to claim 8,
wherein the arithmetic unit respectively selects a target value regarding the power interruption time and a target value regarding the power interruption count among the plurality of target values in which the mean time between failures will become longest based on the respective calculation results regarding the power consumption and mean time between failures of the storage unit in the operation period, and calculates [an operation schedule] obtained by allocating the power interruption time along a temporal axis of the operation period based on a target value regarding the selected power interruption time and a target value regarding the power interruption count as a power interruption operation schedule.

11. The storage apparatus according to claim 8, further comprising:
a power control unit for controlling a power source of the storage device according to an arithmetic result of the arithmetic unit;
wherein the arithmetic unit respectively selects a target value regarding the power interruption time and a target value regarding the power interruption count among the plurality of target values in which the mean time between failures will become longest based on the respective calculation results regarding the power consumption and mean time between failures of the storage unit in the operation period, and calculates [an operation schedule] obtained by allocating the power interruption time along a temporal axis of the operation period based on a target value regarding the selected power interruption time and a target value regarding the power interruption count as a power interruption operation schedule; and
wherein the power control unit controls the power interruption time of a power source of the storage device according to the power interruption operation schedule calculated with the arithmetic unit.

12. The storage apparatus according to claim 8, further comprising:
a measurement unit for respectively measuring the actual power interruption time and power interruption count per setting time of a storage device configuring the storage unit;
wherein the arithmetic unit analyzes each measurement of the measurement unit according to an access status to the storage unit, respectively calculates a plurality of auxiliary target values regarding a power interruption time and a power interruption count per setting time of the storage unit based on the analysis, calculates power consumption and mean time between failures of the storage unit in the operation period based on the calculated plurality of auxiliary target values, and calculates an auxiliary power interruption operation target in which the mean time between failures in the operation period will become longest based on each of the calculation results.

13. The storage apparatus according to claim 8, further comprising:
a measurement unit for respectively measuring the actual power interruption time and power interruption count per setting time of a storage device configuring the storage unit;
wherein the arithmetic unit analyzes each measurement of the measurement unit according to an access status to the storage unit, respectively calculates a plurality of auxiliary target values regarding a power interruption time and a power interruption count per setting time of the storage unit based on the analysis, respectively calculates power consumption and mean time between failures of the storage unit in the operation period based on the calculated plurality of auxiliary target values, respectively selects an auxiliary target value regarding the power interruption time and an auxiliary target value regarding the power interruption count among the plurality of auxiliary target values in which the mean time between failures will become longest based on each of the calculation results, and calculates [an operation schedule] obtained by allocating the power interruption time along a temporal axis of the operation period based on an auxiliary target value regarding the selected power interruption time and an auxiliary target value regarding the power interruption count as an auxiliary power interruption operation schedule.

14. The storage apparatus according to claim 8, further comprising:
a measurement unit for respectively measuring the actual power interruption time and power interruption count per setting time of a storage device configuring the storage unit; and
a power control unit for controlling a power source of the storage device according to an arithmetic result of the arithmetic unit;
wherein the arithmetic unit respectively selects a target value regarding the power interruption time and a target value regarding the power interruption count among the plurality of target values in which the mean time between failures will become longest based on the respective calculation results regarding the power consumption and mean time between failures of the storage unit in the operation period, calculates [an operation schedule] obtained by allocating the power interruption time along a temporal axis of the operation period based on a target value regarding the selected power interruption time and a target value regarding the power interruption count as a power interruption operation schedule, analyzes each measurement of the measurement unit according to an access status to the storage unit, respectively calculates a plurality of auxiliary target values regarding a power interruption time and a power interruption count per setting time of the storage unit based on the analysis, respectively calculates power consumption and mean time between failures of the storage unit in the operation period based on the calculated plurality of auxiliary target values, respectively selects an auxiliary target value regarding the power interruption time and an auxiliary target value regarding the power interruption count among the plurality of auxiliary target values in which the mean time between failures will become longest based on each of the calculation results, calculates [an operation schedule] obtained by allocating the power interruption time along a temporal axis of the operation period based on an auxiliary target value regarding the selected power interruption time and an auxiliary target value regarding the power interruption count as an auxiliary power interruption operation schedule, compares the mean time between failures in the calculated power interruption operation schedule and the mean time between failures in the calculated auxiliary power interruption operation schedule, and, if the value of the mean time between failures in the auxiliary power interruption operation schedule is greater, commands the power control unit to change to the auxiliary power interruption operation schedule; and wherein the power control unit controls the power interruption time of a power source of the storage device according to the power interruption operation schedule calculated with the arithmetic unit, and, when commanded by the arithmetic unit to change to the auxiliary power interruption operation schedule, controls the power interruption time of a power source of the storage device according to the auxiliary power interruption operation schedule.

15. A storage subsystem, comprising:

a storage unit for storing data to be accessed by a host system;

a storage apparatus including a disk control unit for write-accessing or read-accessing the storage unit based on an access request from the host system; and a management terminal for sending and receiving information to and from the storage apparatus via communication network and managing the storage apparatus;

wherein the management terminal inputs a plurality of target values respectively set regarding a power interruption time and a power interruption count per setting time of the storage unit, calculates mean time between failures of the storage unit in an operation period that is longer than a setting time based on the input plurality of target values, and selects a power interruption operation target value in which the mean time between failures in the operation period will become longest based on each of the calculation results.

16. The storage subsystem according to claim 15, wherein the management terminal respectively selects a target value regarding the power interruption time and a target value regarding the power interruption count among the plurality of target values in which the mean time between failures will become longest as the power interruption operation target, and respectively outputs a target value regarding the selected power interruption time and a target value regarding the power interruption count.

17. The storage subsystem according to claim 15, wherein the management terminal respectively selects a target value regarding the power interruption time and a target value regarding the power interruption count among the plurality of target values in which the mean time between failures will become longest as the power interruption operation target, and respectively outputs a target value regarding the selected power interruption time and a target value regarding the power interruption count.

18. The storage subsystem according to claim 15, wherein the management terminal respectively selects a target value regarding the power interruption time and a target value regarding the power interruption count among the plurality of target values in which the mean time between failures will become longest based on the respective calculation results regarding the power consumption and mean time between failures of the storage unit in the operation period, and calculates [an operation schedule] obtained by allocating the power interruption time along a temporal axis of the operation period based on a target value regarding the selected power interruption time and a target value regarding the power interruption count as a power interruption operation schedule.

19. The storage subsystem according to claim 15, wherein the storage apparatus further comprises a power control unit for controlling a power source of the storage device according to an arithmetic result of the arithmetic unit;

wherein the management terminal respectively selects a target value regarding the power interruption time and a target value regarding the power interruption count among the plurality of target values in which the mean time between failures will become longest based on the respective calculation results regarding the power consumption and mean time between failures of the storage unit in the operation period, and calculates [an operation schedule] obtained by allocating the power interruption time along a temporal axis of the operation period based on a target value regarding the selected power interruption time and a target value regarding the power interruption count as a power interruption operation schedule; and wherein the power control unit controls the power interruption time of a power source of the storage device according to the power interruption operation schedule calculated with the management terminal.

20. The storage subsystem according to claim 15, wherein the storage apparatus further comprises a measurement unit for respectively measuring the actual power interruption time and power interruption count per setting time of a storage device configuring the storage unit; and wherein the management terminal analyzes each measurement of the measurement unit according to an access status to the storage unit, respectively calculates a plurality of auxiliary target values regarding a power interruption time and a power interruption count per setting time of the storage unit based on the analysis, respectively calculates power consumption and mean time between failures of the storage unit in the operation period based on the calculated plurality of auxiliary target values, respectively selects an auxiliary target value regarding the power interruption time and an auxiliary target value regarding the power interruption count among the plurality of auxiliary target values in which the mean time between failures will become longest based on each of the calculation results, and calculates [an operation schedule] obtained by allocating the power interruption time along a temporal axis of the operation period based on an auxiliary target value regarding the selected power interruption time and an auxiliary target value regarding the power interruption count as an auxiliary power interruption operation schedule.

21. The storage subsystem according to claim 15, wherein the storage apparatus further comprises:

a measurement unit for respectively measuring the actual power interruption time and power interruption count per setting time of a storage device configuring the storage unit; and a power control unit for controlling a power source of the storage device according to an arithmetic result of the arithmetic unit;

wherein the management terminal respectively selects a target value regarding the power interruption time and a target value regarding the power interruption count among the plurality of target values in which the mean time between failures will become longest based on the respective calculation results regarding the power consumption and mean time between failures of the storage unit in the operation period, calculates [an operation schedule] obtained by allocating the power interruption time along a temporal axis of the operation period based on a target value regarding the selected power interruption time and a target value regarding the power interruption count as a power interruption operation schedule, analyzes each measurement of the measurement unit according to an access status to the storage unit, respectively calculates a plurality of auxiliary target values regarding a power interruption time and a power interruption count per setting time of the storage unit based on the analysis, respectively calculates power consumption and mean time between failures of the storage unit in the operation period based on the calculated plurality of auxiliary target values, respectively selects an auxiliary target value regarding the power interruption time and an auxiliary target value regarding the power interruption count among the plurality of auxiliary target values in which the mean time between failures will become longest based on each of the calculation results, calculates [an operation schedule] obtained by allocating the power interruption time along a temporal axis of the operation period based on an auxiliary target value regarding the selected power interruption time and an auxiliary target value regarding the power interruption count as an auxiliary power interruption operation schedule, compares the mean time between failures in the calculated power interruption operation schedule and the mean time between failures in the calculated auxiliary power interruption operation schedule, and, if the value of the mean time between failures in the auxiliary power interruption operation schedule is greater, commands the power control unit to change to the auxiliary power interruption operation schedule; and wherein the power control unit controls the power interruption time of a power source of the storage device according to the power interruption operation schedule calculated with the arithmetic unit, and, when commanded by the arithmetic unit to change to the auxiliary power interruption operation schedule, controls the power interruption time of a power source of the storage device according to the auxiliary power interruption operation schedule.

* * * * *